G. S. BAKER & J. CRAMB.
APPARATUS FOR PROVING DOUGH AND THE LIKE.
APPLICATION FILED MAY 13, 1914.

1,250,125.

Patented Dec. 18, 1917.
3 SHEETS—SHEET 1.

WITNESSES
INVENTORS
GEORGE SAMUEL BAKER & JOHN CRAMB
by
Attorney.

G. S. BAKER & J. CRAMB.
APPARATUS FOR PROVING DOUGH AND THE LIKE.
APPLICATION FILED MAY 13, 1914.

1,250,125.

Patented Dec. 18, 1917.

WITNESSES.

INVENTORS
GEORGE SAMUEL BAKER & JOHN CRAMB.
by
Attorney.

UNITED STATES PATENT OFFICE.

GEORGE SAMUEL BAKER AND JOHN CRAMB, OF LONDON, ENGLAND, ASSIGNORS TO JOSEPH BAKER & SONS LIMITED, OF LONDON, ENGLAND.

APPARATUS FOR PROVING DOUGH AND THE LIKE.

1,250,125. Specification of Letters Patent. Patented Dec. 18, 1917.

Application filed May 13, 1914. Serial No. 838,248.

*To all whom it may concern:*

Be it known that we, GEORGE SAMUEL BAKER and JOHN CRAMB, subjects of the King of England, residing at London, N. W., in England, have invented certain new and useful Improvements Relating to Apparatus for Proving Dough and the like, of which the following is a specification.

This invention relates to apparatus for proving dough and the like, of that class which include or comprise an endless conveyer, chain, or equivalent, carrying a number of trays or receptacles for receiving the lumps of dough, with means for maintaining the trays in horizontal positions throughout all their directions of travel.

The invention consists in a particular disposition of the conveyer whereby economy of space is produced and danger of interference of the receptacles on one run of the conveyer with those on another run is obviated; and in novel means for maintaining the horizontal position of the receptacles.

Figure 1:
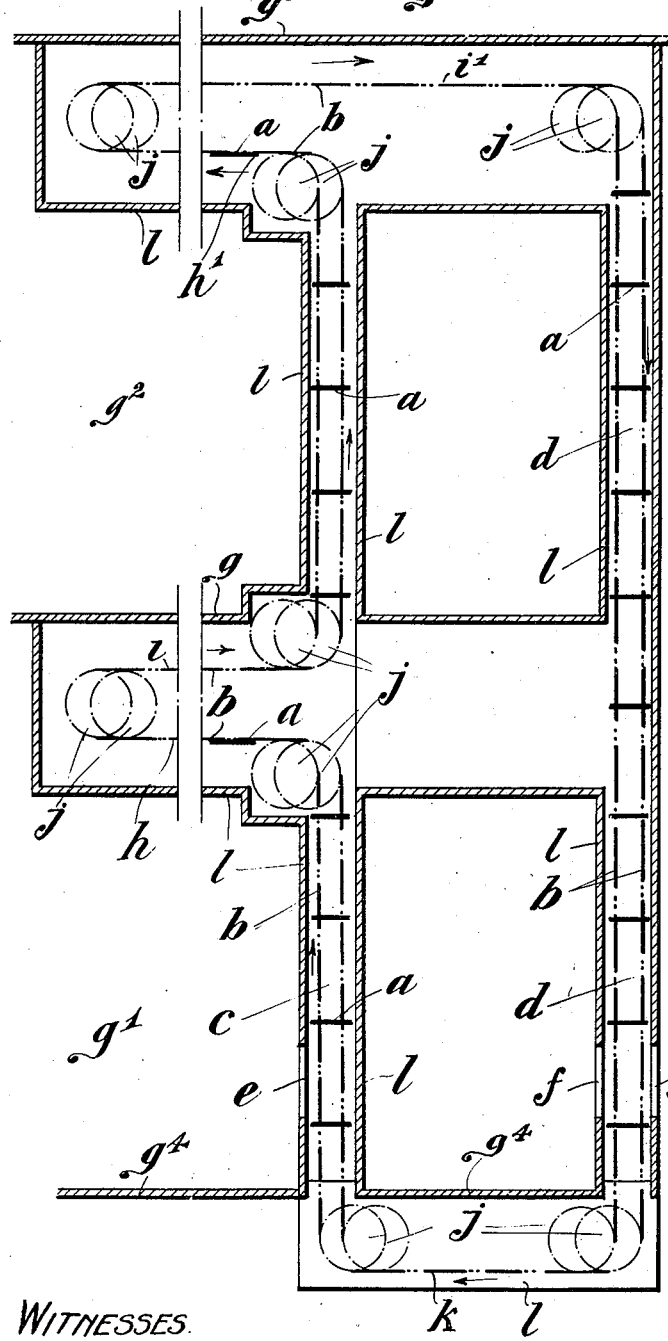
Figure 2:
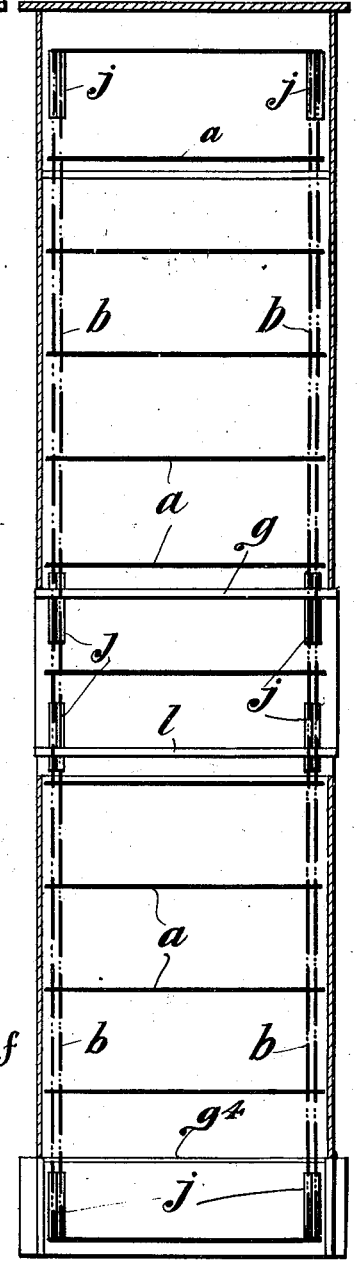
Figure 3:
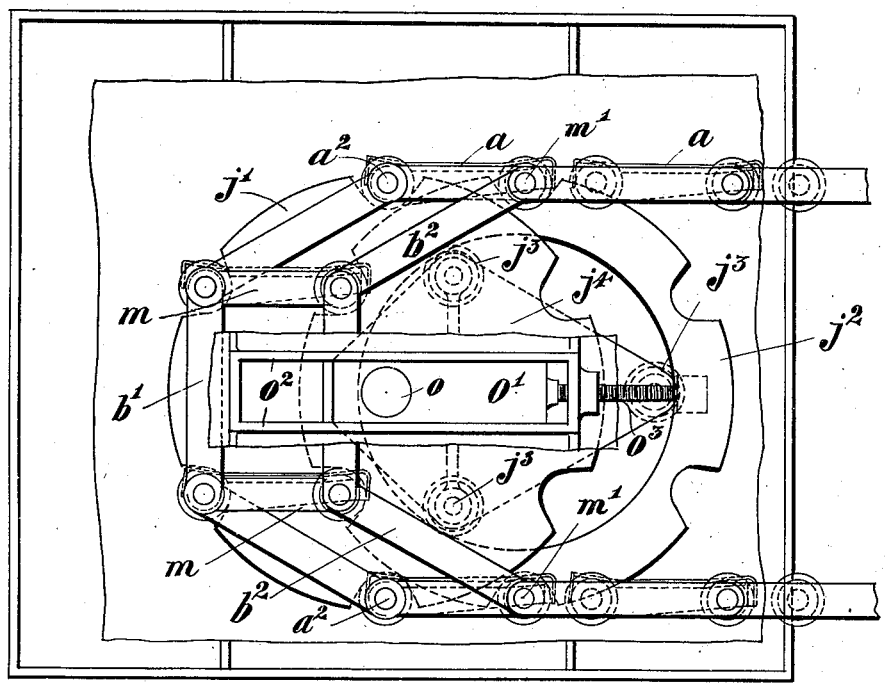
Figure 4:
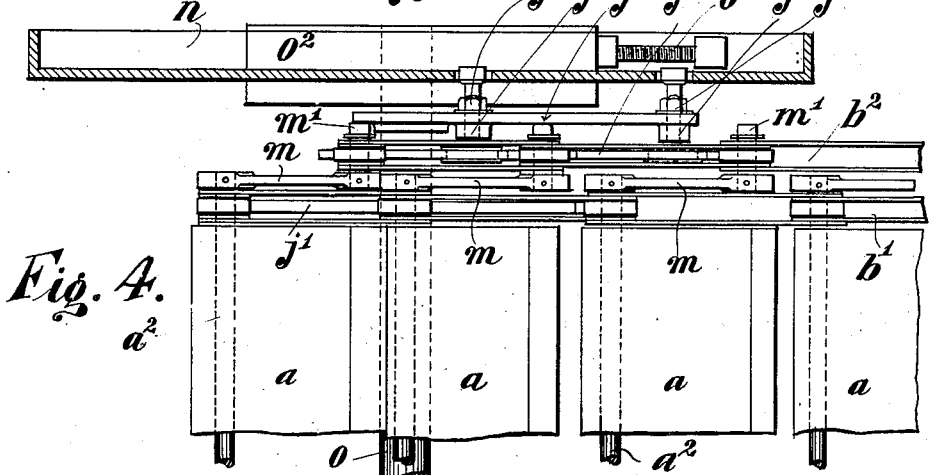
Figure 7:
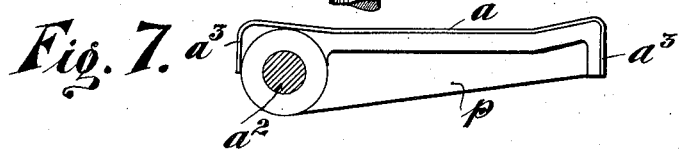
Figure 5:
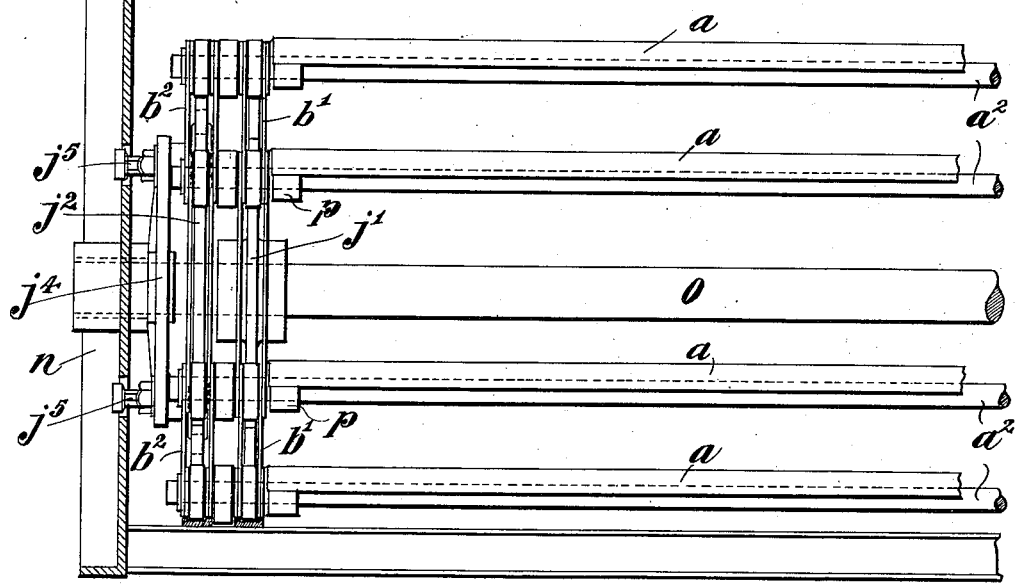
Figure 6:
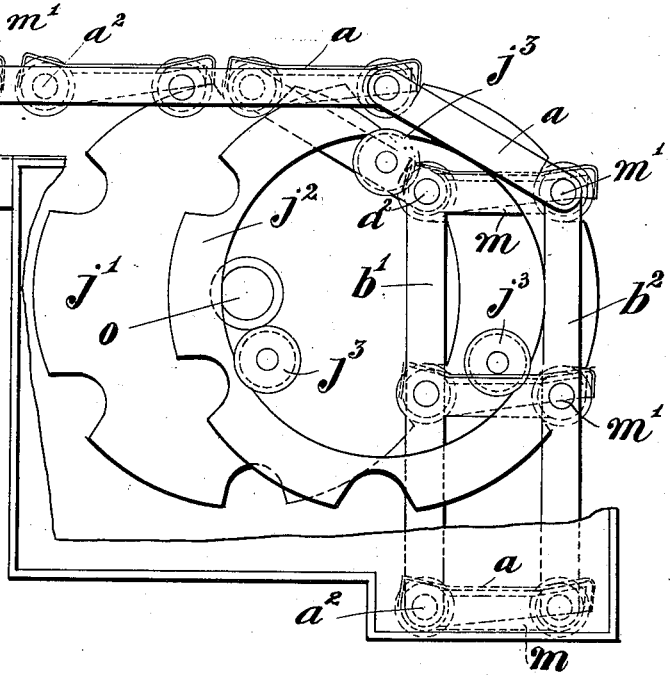

The accompanying drawings show an embodiment of the invention, Figure 1 being a diagram showing the arrangement of the course of the prover conveyer and receptacles, Fig. 2 is a diagrammatic end view from the right of Fig. 1. Fig. 3 is an elevation of one end of the prover conveyer showing the novel means for keeping the receptacles horizontal. Fig. 4 is a partial plan view of Fig. 3. Fig. 5 is a partial end view of Fig. 3, the framing in these two latter figures being shown in section. Fig. 6 is an elevation showing another part of the prover conveyer, and Fig. 7 is a detail view of a receptacle and support therefor.

As shown in Figs. 1 and 2, the receptacles $a$ are carried by pairs of chains $b$, so arranged as to provide two vertical runs $c$ and $d$ adjacent one of which, for instance $c$, may be provided means at $e$ for feeding the lumps of dough into or onto the receptacles or on which they may be placed by hand, and the other run of which preferably passes close to the oven (not shown) where there may be provided means at $f$ for discharging the proved lumps of dough from the receptacles to the oven or otherwise. Between the feed run $c$ and the discharge run $d$ the conveyer is carried along close to the ceiling $g$ of the chamber $g^1$ in which the apparatus is located in two horizontal runs $h$ and $i$, being suitably guided over wheels or pulleys $j$, and should the space available be insufficient to give the dough sufficient time to be proved during the course described, the upper horizontal run $i$ may be deflected to pass through the ceiling $g$ to another chamber $g^2$ above, and thence up close to the ceiling $g^3$ of this second chamber in two horizontal runs $h^1$ and $i^1$ before returning to the vertical discharge run $d$ and so on through as many chambers as may be desired, according to the length of course required. At the ground floor the horizontal run $k$ connecting the feed and discharge runs $c$ and $d$ respectively may be passed below the floor $g^4$ to be well out of the way, or may be disposed close to said floor. The entire device may be inclosed if necessary by casings $l$ to provide protection or to afford chambers for reception of a temperature controlling medium according to requirements.

By thus arranging the course of the conveyer the various runs thereof are well separated and no danger exists of the receptacles on one run of said conveyer interfering with those on another, and again the disposition of certain runs close to the ceiling or ceilings makes for economy of space, leaving the greater part of the chamber or chambers clear for the feeding, discharge and other operations.

To now refer to Figs. 3 to 6, in attaching the receptacles $a$ to the conveyer chains we make use of novel means for positively guiding same in such a manner that the horizontal position of said receptacles is maintained both when traveling in horizontal or vertical directions or when passing around the wheels or pulleys which guide the chains in their various runs, or which drive said chains, and to this end the receptacles $a$ are pivotally connected by means of spindles $a^2$ at one side thereof to the main carrying or driving chains $b^1$ in the usual manner, but at their other sides are guided or supported by a further or auxiliary chain $b^2$ which may if desired be of a lighter character as it merely acts to guide the receptacles. The method shown of carrying out this feature is to positively connect the receptacle $a$ by means of its spindle $a^2$ to a crank or outrigger arm $m$ having a pivot $m^1$ on which the guide chain $b^2$ is mounted at the junction of its links, said outrigger or crank arm and connected parts being disposed outside or clear of the main chain $b^1$ and guide pulleys $j^1$, separate guiding pulleys $j^2$ being provided for said guide chain.

In the construction shown, said pulleys $j^2$ are in the form of ring sprockets, the internal diameter of which is supported by flanged runners $j^3$ mounted on a plate $j^4$ outside the chain, said plate being mounted on the spindle $o$ of the main chain pulley $j^1$ and held by studs $j^5$ extending from the framing $n$. Adjustment of the chains may be produced by mounting the spindle $o$ of said pulley $j^1$ in a slide block $o^1$ adapted to slide on guides $o^2$ in the framing $n$ and under the action of a screw $o^3$.

The plate $j^4$ is part of or fixed to the slide block forming the flange thereof, and it is provided to make a support for the guiding chain pulley $j^2$ so that it can be adjusted with the main driving chain sprocket. Where there is no adjustment the roller bearing pins are fixed to the side frame of the prover.

Fig. 7 shows the construction adopted in mounting the receptacles $a$ on the main chains $b^1$, a bracket $p$ being mounted at each side on the spindle $a^2$ and carrying the receptacle shown in the form of a tray on their upper surfaces, the tray having depending flanges $a^3$ to prevent shifting.

Other means may also be adopted according to requirements so long as the principle outlined, viz. the use of an auxiliary or guide chain for the purpose mentioned, is maintained.

What we claim as our invention and desire to secure by Letters Patent of the United States is:—

A conveying apparatus of the character described comprising an endless conveyer composed of link members, of a plurality of receptacles, means for pivotally mounting the receptacles to the conveyer comprising a transverse spindle carried by each receptacle near one side, and passing through openings in the adjacent ends of the conveyer links to pivotally connect said links, the spindles having a projecting part extending beyond the conveyer, an auxiliary guide chain adjacent the conveyer, an outrigger arm connected to the projecting part of each spindle and extending parallel with its receptacle to a point near its free side, said outrigger arms each having a portion connected with the auxiliary guide chain for maintaining the receptacles in a horizontal position, and means for mounting the guide chain, substantially as described.

In witness whereof we have signed this specification in the presence of two witnesses.

GEORGE SAMUEL BAKER.
JOHN CRAMB.

Witnesses:
O. J. WORTH,
W. E. ROGERS.